(12) United States Patent
Kim et al.

(10) Patent No.: US 10,291,900 B2
(45) Date of Patent: May 14, 2019

(54) METHOD AND APPARATUS FOR NORMALIZING SIZE OF CONTENT IN MULTI-PROJECTION THEATER

(71) Applicant: CJ CGV CO., LTD., Seoul (KR)

(72) Inventors: Hwan Chul Kim, Seoul (KR); Su Ryeon Kang, Goyang-si (KR); Jihyung Kang, Hwaseong-si (KR)

(73) Assignee: CJ CGV CO., LTD., Seoul (KR)

( * ) Notice: Subject to any disclaimer, the term of this patent is extended or adjusted under 35 U.S.C. 154(b) by 21 days.

(21) Appl. No.: 14/897,406

(22) PCT Filed: Nov. 20, 2014

(86) PCT No.: PCT/KR2014/011204
§ 371 (c)(1),
(2) Date: Dec. 10, 2015

(87) PCT Pub. No.: WO2015/076588
PCT Pub. Date: May 28, 2015

(65) Prior Publication Data
US 2016/0127711 A1      May 5, 2016

(30) Foreign Application Priority Data
Nov. 20, 2013   (KR) .................... 10-2013-0141077

(51) Int. Cl.
*G03B 21/56*     (2006.01)
*H04N 13/167*    (2018.01)
(Continued)

(52) U.S. Cl.
CPC ........... *H04N 13/167* (2018.05); *G03B 21/56* (2013.01); *G06F 16/5838* (2019.01);
(Continued)

(58) Field of Classification Search
CPC ...... G03B 21/56; G03B 21/147; G03B 37/00; G03B 37/04; H04N 13/0033; H04N 13/0051; H04N 13/0055
See application file for complete search history.

(56) References Cited

U.S. PATENT DOCUMENTS 5,963,247 A      10/1999   Banitt
5,964,064 A  *   10/1999   Goddard ................ A63J 5/021
                                                   352/43
(Continued)

FOREIGN PATENT DOCUMENTS

| JP | 05323944 A | 12/1993 |
| JP | 2002350979 A | 12/2002 |
| JP | 2004186803 A | 7/2004 |
| JP | 2013142902 A | 7/2013 |
| KR | 1020120020793 A | 3/2012 |

OTHER PUBLICATIONS

International Search Report for PCT/KR2014/011204 mailed on Feb. 2, 2015.

*Primary Examiner* — Sultan Chowdhury
(74) *Attorney, Agent, or Firm* — Hauptman Ham, LLP

(57) ABSTRACT

Disclosed herein are a method and apparatus for normalizing the size of content in a multi-projection theater and a computer-readable recording medium. The method may include receiving theater parameters stored in a database, computing the scale factor of an image projected on a main screen based on the received theater parameters, controlling the image projected on the main screen by applying the computed scale factor to the image, and controlling the scale of an image projected on a sub-screen according to the controlled image of the main screen.

15 Claims, 4 Drawing Sheets

(51) Int. Cl.
*H04N 13/144* (2018.01)
*H04N 13/189* (2018.01)
*G06F 16/583* (2019.01)
*G06T 3/00* (2006.01)
*H04N 9/31* (2006.01)
*G06T 3/40* (2006.01)
*G03B 37/00* (2006.01)

(52) U.S. Cl.
CPC ............... *G06T 3/005* (2013.01); *G06T 3/40* (2013.01); *H04N 9/3147* (2013.01); *H04N 9/3188* (2013.01); *H04N 13/144* (2018.05); *H04N 13/189* (2018.05); *G03B 37/00* (2013.01)

(56) References Cited

U.S. PATENT DOCUMENTS

| | | | | |
|---|---|---|---|---|
| 7,221,506 | B1* | 5/2007 | Schlosser | G03B 21/56 160/219 |
| 8,944,612 | B2* | 2/2015 | Chang | G03B 21/13 349/5 |
| 2003/0038922 | A1* | 2/2003 | Ferrell | G03B 21/32 352/85 |
| 2006/0152680 | A1* | 7/2006 | Shibano | G03B 37/04 353/30 |
| 2010/0188488 | A1 | 7/2010 | Birnbaum et al. | |
| 2011/0228104 | A1 | 9/2011 | Nelson | |
| 2013/0181901 | A1 | 7/2013 | West | |

* cited by examiner

METHOD AND APPARATUS FOR NORMALIZING SIZE OF CONTENT IN MULTI-PROJECTION THEATER

CROSS REFERENCE TO RELATED APPLICATION

This application claims the priority of Korean Patent Application No. 10-2013-0141077 filed on Nov. 20, 2013 in the Korean Patent and Trademark Office. Further, this application is the National Phase application of International Application No. PCT/KR2014/011204 filed on Nov. 20, 2014, which is incorporated herein by reference in its entirety.

TECHNICAL FIELD

The present invention relates to a method for controlling the size of content and, more particularly, to a method for normalizing the size of image content projected on each of a plurality of projection surfaces in a multi-projection theater having the plurality of projection surfaces.

BACKGROUND ART

In a prior art, in order to play back images, such as movies and advertisements in a theater, a two-dimensional (2D) image is projected on a single screen disposed at the front of a movie theater. In such a system, audiences inevitably experience only 2D images.

A 3D image-related technology capable of providing a stereoscopic image to audiences has recently been developed. The 3D image technology is based on a principle that when different images enter the left eye and right eye of a person and are merged in a brain, the person is able to feel a three-dimensional effect even in a 2D image. In such a 3D image technology, two cameras on which different polarization filters are mounted are used to capture images, and glasses on which a polarization filter is mounted is used so that different images enter the left eye and right eye of a person when the person watches an image.

However, such a 3D technology may provide a stereoscopic image to a user, but is problematic in that a degree of immersion for an image itself is low because a user merely watches an image played back in a single screen. Furthermore, there is a problem in that the direction of a three-dimensional effect felt by audiences is limited to a direction in which a single screen is placed. Furthermore, the conventional 3D technology is problematic in that it may cause inconvenience for audiences who watch images because the audiences must wear glasses on which a polarization filter is mounted and that sensitive audiences may feel dizzy or sick because different images are forced to enter the left eye and right eye of a user.

Accordingly, a so-called "multi-projection system" (a preceding application of this application) capable of solving the problems of a conventional screening system based on a single screen was proposed. In this case, the "multi-projection system" means a system in which a plurality of projection surfaces (e.g., a screen and the surface of a wall) is disposed in the vicinity of stands and images having a sense of unity are played back on the plurality of projection surfaces so that audiences may have three-dimensional effects and immersive experiences. Furthermore, a "multi-projection theater" means a theater in which such a multi-projection system has been constructed. FIG. 1 illustrates an example of such a multi-projection system.

In order to effectively manage the multi-projection system, there is a need for technologies capable of effectively correcting images projected on a plurality of projection surfaces. The reason for this is that in the multi-projection system, an image correction process is very complicated and it is very likely that an error may occur because a plurality of images projected on a plurality of projection surfaces not on a single projection surface needs to be integrated and corrected and a method of correcting a plurality of images needs to be changed according to a change in the structure of a theater. Accordingly, there is a need for technologies that may assist the image correction process of such a multi-projection system.

In addition to such a multi-projection system, images may be projected on a single projection surface using a plurality of projectors. For example, images may be projected on a single projection surface using a plurality of projectors if the width of a projection surface is wide or if a length-width ratio of a projection surface is not handled by a single projector.

If images are to be projected using a plurality of projectors, it is very important to provide images having a sense of unity. In particular, images need to be corrected so that the boundaries of images or the overlap area and non-overlap area of images projected by respective projectors are not distinct.

SUMMARY OF INVENTION

Technical Problem

Accordingly, the present invention has been made keeping in mind the above problems occurring in the prior art, and an object of the present invention is to provide an image generally having a sense of unity in a multi-projection theater.

Solution to Problem

In an aspect of the present invention, a method for normalizing the size of content in a multi-projection theater include receiving theater parameters stored in a database, computing the scale factor of an image projected on a main screen based on the received theater parameters, controlling the image projected on the main screen by applying the computed scale factor to the image, and controlling the scale of an image projected on a sub-screen according to the controlled image of the main screen.

In another embodiment of the present invention, controlling the scale of the image projected on the sub-screen may include controlling the image projected on the main screen and the image projected on the sub-screen so that the images have the same height.

In another embodiment of the present invention, controlling the scale of the image projected on the sub-screen may include controlling the image projected on the main screen and the image projected on the sub-screen so that the images have the same pixel size or ratio or a difference between the pixel sizes or ratios is a specific reference or less.

In an embodiment of the present invention, the method may further include controlling the location of the image projected on the sub-screen by applying theater parameters after controlling the scale of the image projected on the sub-screen if the main screen and the sub-screen are not contiguous. In this case, controlling the location of the image projected on the sub-screen may include controlling the location of the image projected on the sub-screen by a space between the main screen and the sub-screen.

In another embodiment of the present invention, if the main screen and the sub-screen are not contiguous, controlling the image projected on the main screen may include enlarging the image projected on the main screen by applying the theater parameters and cropping the enlarged image according to the size of the main screen. In this case, the image of the main screen may be enlarged by a ratio of the size of a theater and the size of the main screen.

Controlling the image projected on the main screen may include controlling the width to length ratio of the image projected on the main screen per pixel.

In another aspect of the present invention, an apparatus for normalizing the size of content in a multi-projection theater includes a database configured to store theater parameters and a control unit configured to receive the theater parameters from the database and control images projected on a main screen and a sub-screen. The control unit is configured to includes a scale factor operation module configured to compute the scale factor of the image projected on the main screen based on the received theater parameters, a main screen image control module configured to control the image projected on the main screen by incorporating the computed scale factor into the image, and a sub-screen image control module configured to control the scale of the image projected on the sub-screen according to the controlled image of the main screen.

In another embodiment of the present invention, the sub-screen image control module may be configured to control the image projected on the main screen and the image projected on the sub-screen so that the images have the same height and to control the image projected on the main screen and the image projected on the sub-screen so that the images have the same pixel size or ratio or a difference between the pixel sizes or ratios is a specific reference or less.

Furthermore, the sub-screen image control module may be configured to control the location of the image projected on the sub-screen by applying theater parameters if the main screen and the sub-screen are not contiguous as a result of analysis of the theater parameters received from the database. In this case, the sub-screen image control module may be configured to control the location of the image projected on the sub-screen by a space between the main screen and the sub-screen.

In another embodiment of the present invention, if the main screen and the sub-screen are not contiguous, the main screen image control module may be configured to enlarge the image projected on the main screen by applying the theater parameters and to crop the enlarged image according to the size of the main screen. In this case, the image of the main screen may be enlarged by a ratio of the size of a theater and the size of the main screen. The main screen image control module may be configured to control the width to length ratio of the image projected on the main screen per pixel.

The present invention includes the form of a computer-readable recording medium on which a program for executing the method for normalizing the size of content in a multi-projection theater has been recorded.

Advantageous Effects of Invention

In accordance with the present invention, images having a sense of unity can be played back in a multi-projection screening system for projecting images on a plurality of faces.

MODE FOR THE INVENTION

Some exemplary embodiments of the present invention are described in detail with reference to the accompanying drawings.

Figure 1:
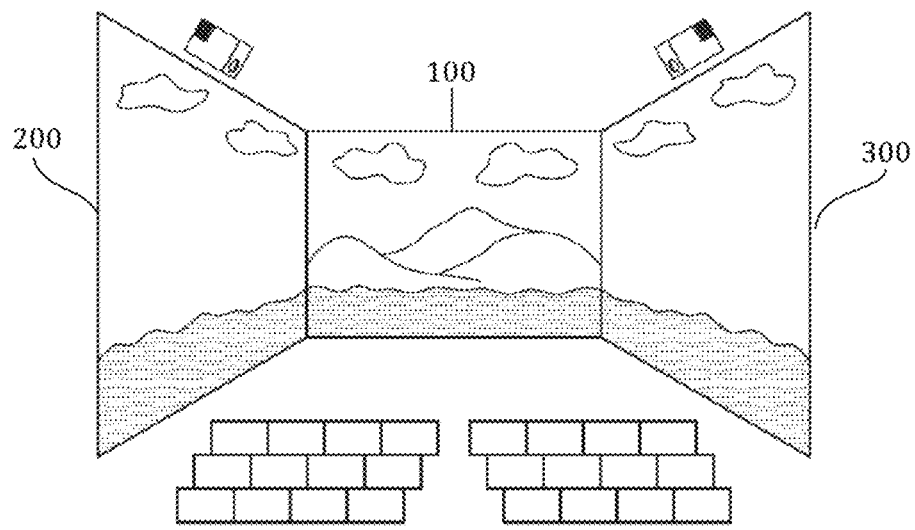
FIG. 1 is a diagram illustrating an example of the structure of a multi-projection system.
Figure 2:
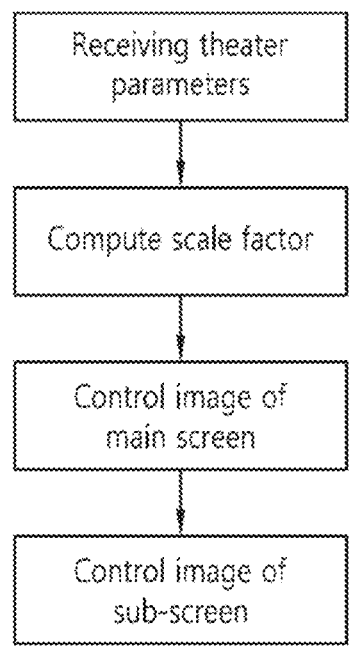
FIG. 2 is a flowchart illustrating a method for normalizing the size of content in accordance with an embodiment of the present invention.

FIG. 2 is a flowchart illustrating a method for normalizing the size of content in accordance with an embodiment of the present invention.

A method for normalizing the size of content in accordance with an embodiment of the present invention may include receiving theater parameters stored in a database, computing the scale factor of an image projected on a main screen based on the received theater parameters, controlling the image projected on the main screen by applying the computed scale factor to the image, and controlling the scale of an image projected on a sub-screen according to the controlled image of the main screen.

The method in accordance with an embodiment of the present invention is executed by an apparatus for normalizing the size of content, etc. In order to normalize the size of content, first, theater parameters are received from the database. The theater parameters include information about the size, specification, etc. of a theater. The sizes of the front and the left and right sides and the size of a screen are different in almost all the theaters. The theater parameters for normalizing the size of content are as follows.

theaterWidth=[the width of the front of a theater]

theaterDepth=[the distance between the left and right walls of a theater]

theaterHeight=[the height of the front of a theater]

screenWidth=[the width of a screen]

screenOffset=[a length from the top of a screen to the ceiling of a theater]

screenRatio=[the ratio of a screen]

A variety of pieces of information, such as the size of the front of a theater, the size of a screen, and the size of the side, may be obtained using such parameters. The size of content may be normalized suitably for each theater by taking the variety of pieces of information into consideration. For reference, embodiments of FIGS. 1, 4, 5, and 6 illustrate that a screen is disposed at the front of a theater and an image is directly projected on the surfaces of walls without a separate screen on the left and right sides, but they are only examples. For example, a screen may be disposed on each of the front and the sides, and an image may be projected on the surfaces of walls.

FIGS. 1, 4, 5, and 6 illustrate that screens 100, 200, 300 are disposed at the front and on the left and right sides, but the disposition of screens are not limited thereto. For example, the ceiling surface (i.e., the top surface) and bottom surface of a theater may also become projection surfaces on which images are projected. Furthermore, a separate screen may be disposed or top/bottom surfaces themselves may become screens.

An example in which screens are disposed on the front and on left/right faces is described hereinafter, but the present invention may also be applied to examples in which the height is converted into the width and images are projected on top/bottom surfaces in addition to on the front and the left/right faces.

In an embodiment of the present invention, a projection surface is illustrated as being divided into a screen (i.e., a main screen 100), that is, a criterion for the projection of an image, and a screen (i.e., a sub-screen 200 or 300) on which an image controlled based on the screen projected on the main screen is projected. Furthermore, a front screen 100 is illustrated as being the main screen, for convenience of description. It is however to be noted that a front screen may not be a main screen.

After obtaining the theater parameters, the scale factor of an image projected on a main screen is computed based on the received theater parameters.

The scale factor is a variable reflected in order to control the size of image content according to the screen ratio of a theater and may be determined depending on the type of a theater, in particular, a ratio of a main screen.

For example, a ratio of image content that is currently screened in a theater is a size of 2048*1080 pixels. The screen ratio of a theater is chiefly divided into a scope type (i.e., length:width=2.35:1) and a flat type (i.e., length:width=1.85:1). However, such an example is only a current screen ratio, and various screen ratios may be present in theaters. The present invention may be applied to all of various screen ratios and may also be applied to a screen having a ratio different from the ratio of the scope type or flat type according to an actual size of each theater.

First, an example in which a scale factor is computed in the scope type (2.35:1) is described below with reference to FIG. 4. The top and bottom of image content are subject to digital masking processing in order to adapt the image content for the scope type. In the case of image content of 2048*1080 pixels, 111 pixels at the bottom of the image content are subject to digital masking processing, and only 2048*858 pixels area are projected on the main screen. The 111 pixels have a ratio corresponding to 0.103 assuming that 1080 pixels in length is 1. The image content is projected on an area of 0.103~0.897 in the length of the image content, that is, an area of 0.794 in the total length. However, the numeral values, such as 2048, 1080, 111, and 858, are only an example used in an existing theater. It is to be noted that content must be produced, played back, and projected based on such numeral values and such numeral values may vary depending on the type of an image, the specification of a theater, etc.

The width of the image content is also controlled based on the ratio of 0.794 in which the length of the image content has been controlled. If a scale factor for controlling the width of the image content is x because the image content originally had 2048*1080 pixels, the following is required:

$$2048*x*1:1080*0.794=2.35:1$$

In other words, since 2048*858 pixels obtained by performing digital masking on the 111 pixels at the top and bottom need to be projected on the screen of 2.35:1 ratio, $$2048*x:0.858=2.35:1$$

If this equation is computed, it leads to "the scale factor x in width=0.984."

The meaning of the scale factor x may be interpreted as follows. In principle, a 1 pixel has a square shape in which the width and the length are the same. If the scale factor x (in this example, 0.984) is applied to the width of each pixel in order to adapt the image content, subjected to digital masking by the 111 pixels at the top and bottom, for the screen ratio (2.35:1) of a theater of the scope type, a 1 pixel becomes a rectangular shape in which the width is short, but the length is long. If a scale factor is computed by taking a ratio of the image content and a ratio of the main screen into consideration and the computed scale factor is applied to image content projected on the main screen, the size and ratio of a unit pixel are changed. As a result, the width to length ratio of the image content may be adjusted in such a way as to be suitable for the main screen. That is, how an image will be scaled is computed, the image is controlled based on such scaling, and a degree that the image has been controlled is recorded/managed for each theater so that a degree that an image has been controlled may continue to be tracked for each theater.

Controlling the image projected on the main screen may be expressed in the following logical equation (Table 1).

TABLE 1 pixelRatio = (858*2.35/2048);
if(contentsRatio <= 2.35){
normWidth = (858*contentsRatio/2048)/pixelRatio;
normHeight = 858/1080;
}
else{
normWidth = 1;
normHeight = 2048/(contentsRatio*1080)*pixelRatio;
}

In the above equation, pixelRatio is a scale factor incorporated into image content that is projected on a screen, contentRatio is the width to length ratio of the content, normWidth is the width of normalized content, normHeight is the length of the normalized content.

In the normalization of content, if a content ratio is smaller than 2.35, the ratio of pixels and the size of the content are controlled by applying a scale factor to the width of the content on the basis of the length of the content. If a content ratio is not smaller than 2.35, the ratio of pixels and the size of content are controlled by applying a scale factor to the length of the content on the basis of the width of the content.

Figure 5:
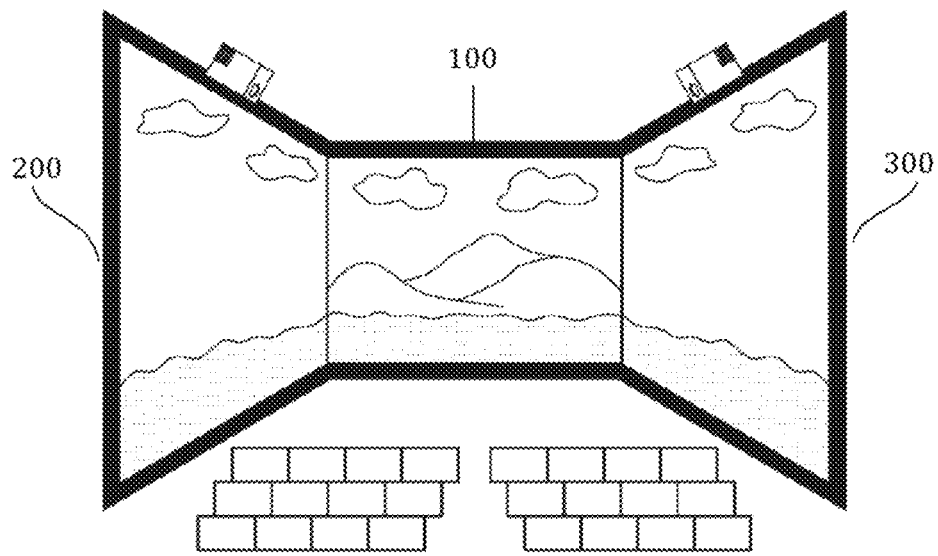

FIG. 5 is a diagram illustrating the size normalization of content in a multi-projection theater including a main screen of the flat type (1.85:1). An example in which a scale factor is computed is described with reference to FIG. 5. In the case of the flat type, the width of an image of 2048*1080 pixels is controlled on the basis of the length of the image because the image needs to be adapted for the ratio of 1.85:1. Since an image of 1998*1080 pixels is suitable for the ratio of 1.85:1, the original 2048 pixels of the image in width need to be multiplied by 0.976, resulting in the 1998 pixel size.

If the ratio of the width is smaller compared to 1.85:1 in a flat type theater, for example, in the case of 1.77:1, 2048 pixels in width need to be controlled because the length is fixed to 1080 pixels. In this example, the 2048 pixels need to be multiplied by 0.933. If the ratio of the width is greater than 1.85, the ratio of the length is controlled in the state in which the ratio of the width is fixed unlike in the previous example. That is, the ratio of the length is determined in the state in which the width is adapted for the ratio of 1.85:1 and multiplied by 0.976. If the ratio of the width is 2.35:1, $$2048*0.976:1080*y=2.35:1$$

As a result, y becomes 0.787. That is, the ratio of an image is controlled by applying a scale factor to the side whose scale needs to be reduced based on the side that has already been controlled. In accordance with such a method, an image can be controlled based on various theater parameters.

A process of normalizing a main screen in a flat type theater may be expressed in the following equation (Table 2).

TABLE 2

```
pixelRatio = 1.0;
if(contentsRatio <= 1.85){
normWidth = (1080*contentsRatio/2048)/pixelRatio;
normHeight = 1;
}
else{
normWidth = 1998/2048;
normHeight = 1998/(contentsRatio*1080)*pixelRatio;
}
```

In the normalization of content, if the width to length ratio of the content is smaller than 1.85, the width of the content is controlled based on the length of the content. If the width to length ratio of the content is equal to or greater than 1.85, the lengthy of the content is controlled based on the width of the content.

After controlling the image projected on the main screen, the scale of an image projected on a sub-screen is controlled according to the controlled image of the main screen.

Controlling the scale of the image projected on the sub-screen may be expressed in the following equation. In this case, it is assumed that the left and right sides are symmetrically scaled and the equation was written based on an image projected on a sub-screen on the right side.

$$center\_project\_width=normWidth*screenWidth;$$

$$center\_project\_height=normHeight*screenWidth/screenRatio;$$

$$right\_project\_height=center\_project\_height;$$

$$right\_project\_width=center\_project\_height*(right \rightarrow width/right \rightarrow height)$$

In this case, right→width and right→height are the width/length of input right image center_project_height and center_project_width mean an image projected on the main screen (i.e., an image having a controlled scale), and an image projected on the sub-screen is controlled based on the image having the controlled scale.

In the above equation, the height of the image projected on the sub-screen on the right side is made identical with that of the image projected on the main screen. The width of the image projected on the sub-screen is determined by taking into consideration the same height and the width to length ratio of the image projected on the main screen per pixel.

However, the height of the image projected on the sub-screen and the height of the image projected on the main screen do not need to be always the same. The height of an image projected on a sub-screen may be higher or lower than that of an image projected on a main screen. The heights of images may differ depending on the property of each of pieces of content, a producer's intention, etc.

Furthermore, the width to length ratio of an image projected on a main screen per pixel may be set according to a user's needs.

In a multi-projection theater, various factors of a front image and side images need to be united in order to play back the images generally having a sense of unity by projecting the images on both the front and the sides.

Figure 6:
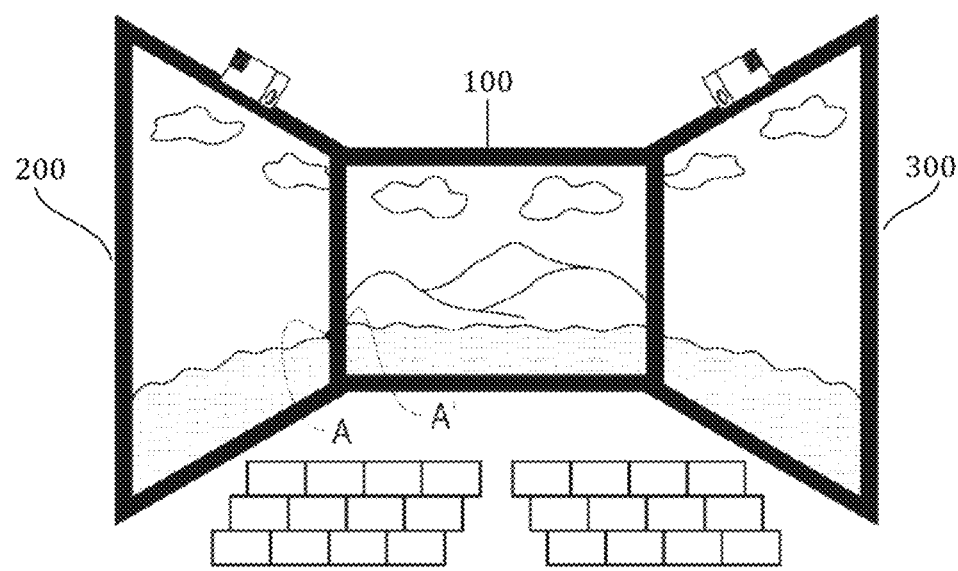

In an embodiment, a front image and side images are played back in the state in which they maintain continuity by controlling the scales of the image projected on the main screen and the image projected on the sub-screen so that the images have the same height. The examples of FIGS. 4 to 6 illustrate states in which the scales of images have been controlled so that the images have the same height.

The aforementioned example illustrates that an image projected on a main screen is first controlled and the scale of an image projected on a sub-screen is then controlled, but the present invention is not limited thereto. For example, after the scale of an image projected on a sub-screen is controlled, an image projected on a main screen may be controlled. That is, order written in the specification or claims is not timeseries, and the order may be changed.

In a system to which an embodiment of the present invention has been applied, audience chiefly looks at image content projected on a front screen. In most cases, an image projected on a front screen is the core of content. Accordingly, a sub-screen preferably may be controlled based on a front screen by considering the front screen to be a main screen. Furthermore, a ratio of a front screen in each theater has been standardized (i.e., the aforementioned scope type and flat type), whereas side screens are different depending on the structure of a theater. Accordingly, it is more efficient to control side screens on the basis of a front screen.

In another embodiment in which the scale of an image projected on a sub-screen is controlled, the scale of an image projected on a sub-screen may be controlled so that the image projected on the sub-screen and an image projected on a main screen have the same pixel size or ratio or a difference between the pixel sizes or ratios of the images projected on the main screen and the sub-screen is a specific reference or less. The present embodiment is intended to maintain a sense of unity of images. A front image and side images are controlled so that they have the same pixel size or a comparable level (i.e., a difference between the pixel sizes is a specific reference or less) and thus the images are played back with the same resolution in a multi-projection theater.

If the pixel size of an image projected on a main screen is a specific reference or more, the following problems may occur. It is herein assumed that the pixel size of an image projected on a main screen is small and the pixel size of an image projected on a sub-screen is great. In a scene in which a person moves from the left to the right, that is, in a scene in which a person moves along a left sub-screen, a main screen, and a right sub-screen, the person is first displayed with low resolution on the left side of the scene, then displayed with high resolution when the person moves to the center (i.e., the front), and then displayed with low resolution when the person moves to the right side of the scene. Immersion is low because audience looks at the person whose image resolution continues to be changed in one scene. Furthermore, even in a scene in which a background is displayed on all the multiple surfaces, if pixel sizes are different in respective projection surfaces, images with different resolution are played back in the projection surfaces. As a result, the images look like different scenes although they correspond to a single scene.

Accordingly, in the present embodiment, an image projected on a main screen and an image projected on a sub-screen are controlled so that they have the same pixel size or a difference between the pixel sizes is a specific reference or less.

Figure 7:
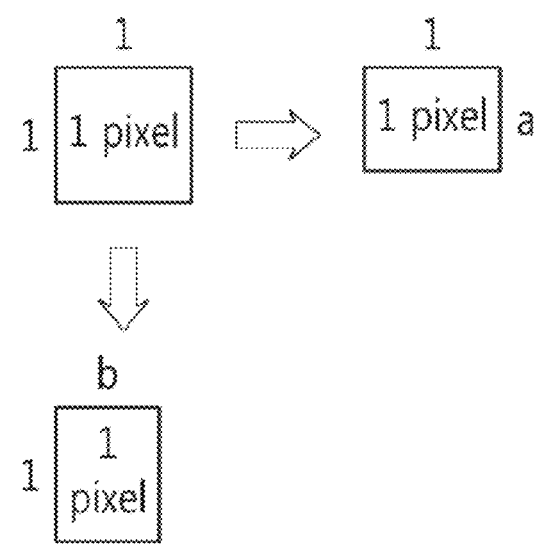
FIG. 7 is a diagram illustrating an example in which the size of content is normalized when an embodiment of the present invention is applied.

In another embodiment, a ratio of a front image and a side image may be controlled. In an image projected on a main screen, the ratio of pixels may be different, that is, a square of 1:1, a rectangle of 1:a, and a rectangle of b:1 ("a", "b" is a value between 0 and 1) depending on a ratio of the main screen as illustrated in FIG. 7. Accordingly, the same image content may be differently represented depending on the ratio of pixels. For example, an image of the same person may be represented as being slim (i.e., the ratio of pixels is b:1) or as being more fat (i.e., the ratio of pixels is 1:a) depending on the ratio of pixels.

In the case of a multi-projection theater in which images are played back in several faces, images played back in respective faces need to be identically recognized by a person. In this case, if a ratio of the images is changed depending on where a person within an image is displayed on any one of the left and right sides and the front, immersion in the images is hindered. In order to solve such a problem, in the present embodiment, the ratios of a front image and side images are controlled so that they are the same or a difference between the ratios is a specific reference or less. In particular, in controlling the ratios, a scale factor computed when computing the scale factor is also incorporated into an image projected on a sub-screen so that a consistent and united image can be played back in the main screen and the sub-screen.

In another embodiment of the present invention, if a main screen and a sub-screen are not contiguous, the location of an image projected on the sub-screen is controlled by applying the theater parameters to the image projected on the sub-screen after controlling the scale of the image projected on the sub-screen. The present embodiment is described with reference to FIG. 6.

Figure 4:
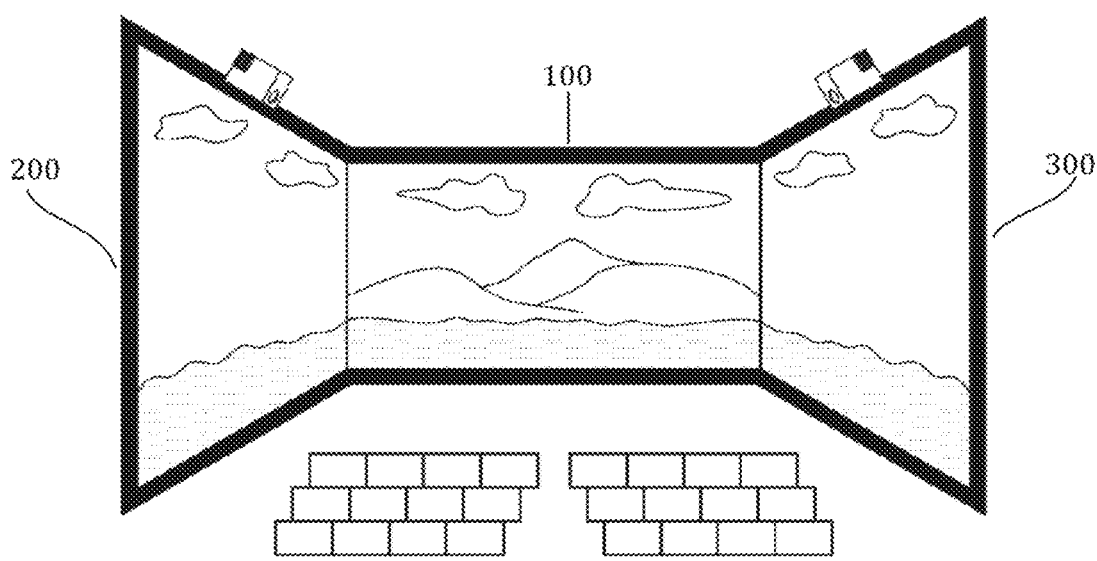
FIGS. 4 to 6 are diagrams illustrating examples in which the present invention is applied to multi-projection theaters having different theater parameters.

Unlike in FIGS. 4 and 5, in FIG. 6, a main screen is separated from a sub-screen. A space between the main screen and the sub-screen may frequently occur when a multi-projection screening system is applied to an existing movie theater. Specific spaces on which images are not projected are also generated on the left and right sides of the main screen because the main screen in an existing movie theater is smaller than the front of the theater. Accordingly, when a multi-projection screening system is applied to an existing movie theater, spaces, such as those of FIG. 6, are generated.

In order to play back images generally having a sense of unity despite such spaces, it is necessary to play back images as if an image is present even in a space in which an image is not represented. That is, in FIG. 6, images need to be played back in A and A' so that the images have a difference of a space even within the images without the images not connected in the entire image. If A and A' represent the same point in an image, audience may recognize that images on a left face, at the front, and on a right face are separated from each other. If images have a difference of a space in the entire image as in the present embodiment, however, general continuity is increased.

To this end, in the present embodiment, the location of an image projected on a sub-screen is moved to a main screen by the space. In other words, the location of an image is controlled in such a way as to crop an image, projected on a side, by the width of the space and move the image. As a result, an effect, such as that described above, can be obtained.

The width of the space may be calculated using the theater parameters stored in the database. The width of the space may be calculated using theaterWidth (the width of the front of a theater) and screenWidth=[the width of a screen] of the listed theater parameters.

margin=(theaterWidth−screenWidth)/2

In this case, margin means the width of the space.

In some theaters, however, a main screen may not be disposed at the center of the front of a theater. That is, margin_left and margin_right may be different. Accordingly, margin may be calculated according to the above equation, margin_left and margin_right may be additionally included in the theater parameters stored in the database, and the location of an image may be controlled by taking the space into consideration based on the stored information.

In another embodiment of the present invention, if a main screen and a sub-screen are not contiguous, controlling an image projected on a main screen may include enlarging the image projected on the main screen by applying the theater parameters to the image and cropping the enlarged image according to the size of the main screen.

In the present embodiment, a main screen and a sub-screen are made to have continuity by controlling the size of an image rather than the location of the image. If a space has occurred due to the size of a main screen and the size of a theater (e.g., the size of the front of the theater), an image projected on the main screen is enlarged by the size of the theater. The enlarged image preferably may have a size connected to a sub-screen without a space.

After the image is enlarged, the enlarged image is cropped according to the size of the main screen, and the cropped image is projected on the main screen.

Thereafter, the scale of an image projected on the side screen is controlled based on the image projected on the main screen (i.e., the image cropped after being enlarged).

The aforementioned method of normalizing the size of content in accordance with an embodiment of the present invention may be implemented by an apparatus for executing the method. For example, a variety of types of computing devices may be used as the apparatus. For example, a computing device including the database and a processor may transfer the theater parameters stored in the database to the processor. The processor may execute the processes described in the embodiments and send a control command into which the results of the execution have been incorporated to an external device (e.g., a projector) so that the size of content is normalized in a multi-projection theater.

The method in accordance with an embodiment of the present invention may be implemented in the form of a program for executing the method, and a computer-readable recording medium on which such a program has been recorded may be also included in the scope of the present invention.

Figure 3:
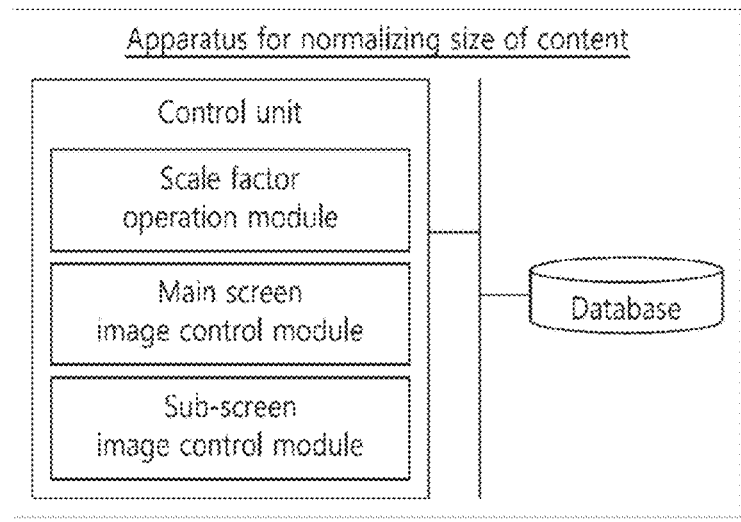
FIG. 3 illustrates the configuration of an apparatus for normalizing the size of content in accordance with an embodiment of the present invention.

An embodiment of the present invention is described below from such a point of view. FIG. 3 illustrates the configuration of the apparatus for normalizing the size of content in accordance with an embodiment of the present invention. The apparatus in accordance with an embodiment of the present invention includes the database configured to store the theater parameters and a control unit configured to receive the theater parameters from the database and to control images projected on a main screen and a sub-screen. The control unit includes a scale factor operation module configured to compute the scale factor of an image projected on a main screen based on received theater parameters, a main screen image control module configured to control the image projected on the main screen by incorporating the computed scale factor into the image, and a sub-screen image control module configured to control the scale of an image projected on a sub-screen according to the controlled image of the main screen. That is, the control unit basically includes an element for storing basic information for normalization and an element for normalizing content using the basic information.

In an embodiment of the apparatus, the sub-screen image control module may control an image projected on a main screen and an image projected on a sub-screen so that the images have the same height. This has been described above in detail, and thus a detailed description thereof is omitted in order to avoid redundancy.

Furthermore, in another embodiment of the apparatus, the sub-screen image control module may control an image projected on a main screen and an image projected on a sub-screen so that the images have the same pixel size or ratio or a difference between the pixel sizes or ratios is a specific reference or less.

Furthermore, if a main screen and a sub-screen are not contiguous as a result of analysis of the theater parameters received from the database, the sub-screen image control module may control the location of an image projected on the sub-screen by applying the theater parameters to the image. For example, the sub-screen image control module may control the location of an image projected on a sub-screen by a space between a main screen and the sub-screen.

If a main screen and a sub-screen are not contiguous, the main screen image control module may enlarge an image projected on the main screen by applying the theater parameters to the image and crop the enlarged image according to the size of the main screen. In this case, the image of the main screen may be enlarged by a ratio of the size of the front of a theater and the size of the main screen.

Furthermore, the main screen image control module may control the width to length ratio of an image projected on a main screen per pixel.

The embodiments of the present invention have been disclosed for illustrative purposes, and those skilled in the art will appreciate that various modifications, additions and substitutions are possible, without departing from the scope and spirit of the invention as disclosed in the accompanying claims.

The invention claimed is:

1. A method for normalizing a size of content in a multi-projection theater, the method performed by an apparatus having a scale factor operation module, a main screen image control module, a sub-screen image control module, and a database, the method comprising:
   receiving by the scale factor operation module, theater parameters of the multi-projection theater stored in a database;
   computing, by the scale factor operation module, a scale factor of an image data projected on a main screen based on the received theater parameters;
   adjusting, by the main screen image control module, the image data projected on the main screen by applying the computed scale factor to the image data; and
   adjusting, by the sub-screen image control module, a scale of an image data projected on a sub-screen according to the adjusted image data projected on the main screen,
   wherein the theater parameters include information on a size of the multi-projection theater, and
   wherein the image data projected on the main screen and the image data projected on the sub-screen are adjusted so that a difference between pixel sizes or ratios of the both image data is a predetermined reference value or less based on the received theater parameters.

2. The method of claim 1, wherein the image data projected on the sub-screen is adjusted so that the adjusted image data projected on the main screen and the sub-screen have an identical height.

3. The method of claim 1, further comprising;
   adjusting, by the sub-screen image control module, a location of the image data projected on the sub-screen by applying the received theater parameters if the main screen and the sub-screen are not contiguous.

4. The method of claim 3, wherein the location of the image data projected on the sub-screen is adjusted based on a space between the main screen and the sub-screen.

5. The method of claim 1, wherein if the main screen and the sub-screen are not contiguous, the adjusting the image data projected on the main screen comprises:
   enlarging the image data projected on the main screen by applying the received theater parameters, and cropping the enlarged image data according to a size of the main screen.

6. The method of claim 5, wherein the image data projected on the main screen is enlarged by a ratio of a size of a theater and the size of the main screen.

7. The method of claim 1, wherein the adjusting the image data projected on the main screen comprises adjusting a width to length ratio of the image data projected on the main screen per pixel.

8. An apparatus for normalizing a size of content in a multi-projection theater, comprising:
   a database configured to store theater parameters; and
   a control unit configured to receive the theater parameters from the database and control images projected on a main screen and a sub-screen,
   wherein the control unit comprise:
   a scale factor operation module configured to compute a scale factor of the image data projected on the main screen based on the received theater parameters;
   a main screen image control module configured to adjust the image data projected on the main screen by incorporating the computed scale factor into the image data projected on the main screen; and
   a sub-screen image control module configured to adjust a scale of the image data projected on the sub-screen according to the adjusted image data projected on the main screen,
   wherein the theater parameters include information on a size of the multi-projection theater, and
   wherein the image data projected on the main screen and the image data projected on the sub-screen are adjusted so that a difference between pixel sizes or ratios of the both image data is a predetermined reference value or less based on the received theater parameters.

9. The apparatus of claim 8, wherein the sub-screen image control module is configured to adjust the image data projected on the sub-screen so that the adjusted image data projected on the main screen and the sub-screen have an identical height.

10. The apparatus of claim 8, wherein the sub-screen image control module is configured to adjust a location of the image data projected on the sub-screen by applying the received theater parameters if the main screen and the sub-screen are not contiguous as a result of analysis of the received theater parameters.

11. The apparatus of claim 10, wherein the sub-screen image control module is configured to adjust the location of the image data projected on the sub-screen based on a space between the main screen and the sub-screen.

12. The apparatus of claim 8, wherein if the main screen and the sub-screen are not contiguous, the main screen image control module is configured to enlarge the image data projected on the main screen by applying the received theater parameters and to crop the enlarged image data according to a size of the main screen.

13. The apparatus of claim 12, wherein the image data projected on the main screen is enlarged by a ratio of a size of a theater and the size of the main screen.

14. The apparatus of claim 8, wherein the main screen image control module is configured to adjust a width to length ratio of the image data projected on the main screen per pixel.

15. A non-transitory computer-readable recording medium recording a computer program for executing a method for normalizing a size of content in a multi-projection theater, the method performed by an apparatus having a scale factor operation module, a main screen image control module, a sub-screen image control module, and a database, the method comprising:
  receiving, by the scale factor operation module, theater parameters of the multi-projection theater stored in a database;
  computing, by the scale factor operation module, a scale factor of an image data projected on a main screen based on the received theater parameters;
  adjusting, by the main screen image control module, the image data projected on the main screen by applying the computed scale factor to the image data; and
  adjusting, by the sub-screen image control module, a scale of an image data projected on a sub-screen according to the adjusted image data projected on the main screen,
  wherein the theater parameters include information on a size of the multi-projection theater, and
  wherein the image data projected on the main screen and the image data projected on the subscreen are adjusted so that a difference between pixel sizes or ratios of the both image data is a pre-determined reference value or less based on the received theater parameters.

* * * * *